United States Patent [19]
I et al.

[11] Patent Number: 5,671,218
[45] Date of Patent: Sep. 23, 1997

[54] CONTROLLING POWER AND ACCESS OF WIRELESS DEVICES TO BASE STATIONS WHICH USE CODE DIVISION MULTIPLE ACCESS

[75] Inventors: Chih-Lin I, Manalapan; Krishan Kumar Sabnani, Berkeley Heights, both of N.J.

[73] Assignee: Lucent Technologies Inc., Murray Hill, N.J.

[21] Appl. No.: 234,757

[22] Filed: Apr. 28, 1994

[51] Int. Cl.$^6$ ............................. H04B 7/216; H04J 13/02
[52] U.S. Cl. ...................... 370/252; 370/332; 370/335; 455/38.3; 375/205
[58] Field of Search ................. 455/38.3, 54.1, 455/68, 69, 70, 33.2, 33.3, 52.1, 52.2, 52.3, 56.1, 63; 371/5.1, 5.5; 370/17, 18, 95.1, 95.3, 252, 319, 320, 321, 331, 332, 335, 342; 375/200, 205, 206, 225, 227, 277, 254, 285

[56] References Cited

U.S. PATENT DOCUMENTS

| | | | |
|---|---|---|---|
| 4,613,990 | 9/1986 | Halpern | 455/33.2 |
| 5,056,109 | 10/1991 | Gilhousen et al. | 455/69 |
| 5,128,965 | 7/1992 | Henriksson | 455/69 |
| 5,204,970 | 4/1993 | Stengel et al. | 455/69 |
| 5,216,692 | 6/1993 | Ling | 375/205 |
| 5,224,120 | 6/1993 | Schilling | 375/205 |
| 5,245,629 | 9/1993 | Hall | 375/205 |
| 5,267,262 | 11/1993 | Wheatley, III | |
| 5,335,249 | 8/1994 | Krueger et al. | 455/69 |
| 5,524,287 | 6/1996 | Yokoya et al. | 455/126 |

OTHER PUBLICATIONS

D. C. Cox, "Universal Digital Portable Radio Communications," *Proceedings of IEEE*, vol. 75, No. 4, pp. 436-477, Apr. 1987.

D. C. Cox, "Personal Communications -A Viewpoint," *IEEE Communications Magazine*, vol. 28, No. 11, pp. 8-20, Nov. 1990.

A. J. Viterbi, "Wireless Digital Communication: A View Based on Three Lessons Learned," *IEEE Communications Magazine*, vol. 29, No. 9, pp. 33-36, Sep. 1991.

D. J. Goodman, R. A. Valenzuela, K. T. Gayliard, and B. Ramamurthi, "Packet Reservation Multiple Access for Local Wireless Communications," *IEEE Trans. Communications*, vol. COM-37, No. 8, pp. 885-890, Aug. 1989.

S. Nanda, D. J. Goodman, and U. Timor, "Performance of PRMA: A Packet Voice Protocol for Cellular Systems," *IEEE Trans. Veh. Technol.*, vol. VT-40, No. 3, pp. 584-598, Aug. 1991.

B. Tuch, "Development of WaveLAN, an ISM Band Wireless LAN," *AT&T Technical Journal*, vol. VT-72, No. 4, pp. 27-37, Aug. 1993.

R. Marrow and J. Lehnert, "Packet Throughput in Slotted ALOHA DS/SSMA Radio Systems with Random Signature Sequences," *IEEE Trans. Communications*, vol. COM-40, No. 7, pp. 1223-1230, Oct. 1992.

(List continued on next page.)

*Primary Examiner*—Benedict V. Safourek
*Assistant Examiner*—Chau T. Nguyen

[57] ABSTRACT

The invention relates to the use of CDMA techniques. Data signals to be transmitted from a plurality of wireless devices are spread across a common bandwidth. The data signals are received by a base station as a composite spread signal. The base station partially despreads the composite spread signal with unique codes to extract data signals from individual wireless devices. The data rate and quality of service requirements for each wireless device are used to calculate a power factor and a control signal is sent to control the power from a particular wireless device. In addition, a probability of transmission value is calculated based on an equivalent current load value and an equivalent population value. The probability of transmission value determines whether a particular wireless device is allowed access to an uplink frequency channel.

24 Claims, 9 Drawing Sheets

OTHER PUBLICATIONS

N. D. Wilson, R. Ganesh, K. Joseph, and D. Raychaudhuri, "Packet CDMA Versus Dynamic TDMA for Multiple Access in an Integrated Voice/Data PCN," *IEEE J. Selected Areas in Communications*, vol. JSAC–11, No. 6, pp. 870–884, Aug. 1993.

A. Polydoros and J. Silvester, "Slotted Random Access Spread–Spectrum Networks: An Analytical Framework," *IEEE J. Selected Areas in Communications*, vol. JSAC–5, No. 6, pp. 989–1002, Jul. 1987.

J. Y. N. Hui, "Throughput Analysis for Code Division Multiple Accessing of the Spread Spectrum Channel," *IEEE J. Selected Areas in Communications*, vol. JSAC–2, No. 4, pp. 482–486, Jul. 1984.

D. Makrakis and K. M. S. Murthy, "Spread Slotted ALOHA Techniques for Mobile and Personal Satellite Communication Systems," *IEEE J. Selected Areas in Communications*, vol. JSAC–10, No. 6, pp. 985–1002, Aug. 1992.

R. L. Pickholtz, D. L. Schilling, and L. B. Milstein, "Theory of Spread–Spectrum Communications –A Tutorial," *IEEE Trans. Communications*, vol. COM–30, No. 5, pp. 855–884, May 1982.

K. S. Gilhousen et al, "On the Capacity of a Cellular CDMA System," *IEEE Trans. Veh. Technol.*, vol. VT–40, No. 2, pp. 303–312, May 1991.

M. B. Pursley, "Performance Evaluation for Phase–Coded Spread–Spectrum Multiple–Access Communication—Part I: System Analysis," *IEEE Trans. Communications*, vol. COM–25, No. 8, pp. 795–799, Aug. 1977.

M. B. Pursley and D. V. Sarwate, "Performance Evaluation for Phase–Coded Spread–Spectrum Multiple–Access Communication—Part II: Code Sequence Analysis," *IEEE Trans. Communications*, vol. COM–25, No. 8, pp. 800–803, Aug. 1977.

K. Yao, "Error Probability of Asynchronous Spread Spectrum Multiple Access Communication Systems," *IEEE Trans. Communications*, vol. COM–25, No. 8, pp. 803–809, Aug. 1977.

R. Marrow and J. Lehnert, "Bit–to–Bit Error Dependence in Slotted DS/SSMA Packet Systems with Random Signature Sequences," *IEEE Trans. Communications*, vol. COM–37, No. 10, pp. 1052–1061, Oct. 1989.

J. S. Lehnert and M. B. Pursley, "Error Probabilities for Binary Direct–Sequence Spread–Spectrum Communications with Random Signature Sequences," *IEEE Trans. Communications*, vol. COM–35, No. 1, pp. 87–98, Jan. 1987.

J. M. Holtzman, "On Using Perturbation Analysis to Do Sensitivity Analysis: Derivatives vs. Differences," *Proc. IEEE Conf. on Decision and Control*, pp. 2018–2023, Tampa, Florida, Dec. 1989.

J. M. Holtzman, "A Simple, Accurate Method to Calculate Spread–Spectrum Multiple Access Error Probabilities," *IEEE Trans. Communications*, vol. COM–40, No. 3, pp. 1052–1061, Mar. 1992.

H. Heffes and D. M. Lucantoni, "A Markov Modulated Characterization of Packetized Voice and Data Traffic and Related Statistical Multiplexer Performance," *IEEE J. Selected Areas in Communications*, vol. JSAC–4, No. 6, pp. 856–868, Sep. 1986.

P. T. Brady, "A Model for On–Off Speech Patterns in Two–Way Conversation," *The Bell System Technical Journal*, vol. 48, No. 7, pp. 2445–2472, Sep. 1969.

CONTROLLING POWER AND ACCESS OF WIRELESS DEVICES TO BASE STATIONS WHICH USE CODE DIVISION MULTIPLE ACCESS

FIELD OF THE INVENTION

This invention relates to the field of wireless communications. More particularly it relates to more efficient use of a designated frequency spectrum by code division multiple access (CDMA) techniques and access protocols.

BACKGROUND OF THE INVENTION

The recent growth in the use of wireless communication devices, such as mobile telephones, wireless local area networks (LANs) and wireless private branch exchanges (PBXs) has strained the capacity of the electromagnetic frequency spectrum these devices use. Various techniques have been proposed and used for determining which wireless devices are given access to the available frequency spectrum and for efficiently using the available frequency spectrum.

In order to communicate, a wireless device must typically first gain access to an uplink frequency channel of a base station. Base stations typically give access to one wireless device on a single uplink frequency channel based on known protocols such as ALOHA and Busy-Tone. In both of these protocols, a wireless device transmits a request signal to a base station on a request frequency channel and if there are no other wireless devices transmitting request signals at that moment, access to an uplink frequency channel is granted. These protocols while adequate for servicing voice communications on circuit switched networks are not adequate to service sources which transmit bursts of information on packet switched networks.

In addition to protocols which determine which single wireless device is allowed access to a single uplink frequency channel, techniques for permitting the simultaneous access by multiple wireless devices to a single uplink frequency channel of a base station are known. One of these techniques is code division multiple access (CDMA). In CDMA, a digital signal located at a wireless device is multiplied at the wireless device by a unique code corresponding to that device, which spreads the digital signal over a greater bandwidth. For example, a 10 kHz digital signal may be multiplied by a code which effectively creates a 100 kHz spread digital signal.

The spread digital signal is used to modulate a carrier frequency signal which is in the range of the uplink frequency channel and the modulated carrier is transmitted from the wireless device to the base station. The base station receives a composite spread signal of all the modulated carrier frequency signals from all wireless devices transmitting at that point in time. The base station demodulates the composite spread signal and then partially despreads the demodulated signal using the same unique code used at a particular wireless device for spreading. The partially despread signal approximates the pre-spreading data signal for the particular wireless device.

Despreading causes the signal from a particular wireless device to have a power advantage over signals from other wireless devices simultaneously transmitting and thus allows the signal from that particular wireless device to be separated from the signals from the other wireless devices. The power advantage for a particular wireless device is proportional to the spreading bandwidth divided by the data rate for that wireless device. Thus spreading undesirably causes wireless devices with lower data rates to have greater power advantages and consequently greater quality of service than wireless devices with higher data rates.

A new approach for CDMA access by a plurality of wireless devices is needed for wireless devices which have differing data rates and differing quality of service requirements.

SUMMARY OF THE INVENTION

The present invention in one embodiment provides a method and apparatus for determining the type of a particular wireless device and controlling the power transmitted by a wireless device based on the type of wireless device. Preferably, the type is defined by the data rate and quality of service requirements for the wireless device. The power transmitted by a particular wireless device is controlled so that the ratio of the power received at a base station receiving antenna from the particular wireless device to a minimum power level is proportional to the ratio of the data rate of that device to a minimum data rate. In addition, the power transmitted by the particular wireless device is controlled such that the ratio of the power received from the particular wireless device to a minimum power level is proportional to the ratio of the quality of service requirement of that device to a minimum quality of service requirement. The base station of the present invention preferably employs CDMA technology through the use of a despreader.

The present invention in another embodiment provides a method and apparatus for determining whether a particular wireless device is given access to an uplink frequency channel based on an equivalent population value and an equivalent current load value. Wireless devices with higher power levels as required by higher data rates or higher quality of service requirements are given proportionately higher current load shares and population shares for determining an equivalent population value and an equivalent current load value respectively.

The equivalent current load and equivalent population values are preferably used by a base station to determine probability of transmission values for wireless devices of particular types. The type of wireless device is preferably defined by the device's data rate and its quality of service requirement. The probability of transmission value is used by a random generator, preferably at the base station, to determine when a wireless device is permitted access to an uplink frequency channel. Alternatively, the base station may transmit equivalent current load and equivalent population values to wireless devices of a particular type and those wireless devices can then determine the probability of transmission value.

The present invention permits the statistical multiplexing of a large number of different types of wireless devices with different data rates and quality of service requirements. It also allows peak capacity access by one wireless device when all other wireless devices are idle. Furthermore, the present invention allows for the setting of priorities for fair capacity sharing among all busy wireless devices and makes efficient use of the available frequency spectrum.

The above discussed features, as well as additional features and advantages of the present invention will become more readily apparent by reference to the following detailed description and the accompanying drawings.

DETAILED DESCRIPTION OF THE INVENTION

Figure 1:
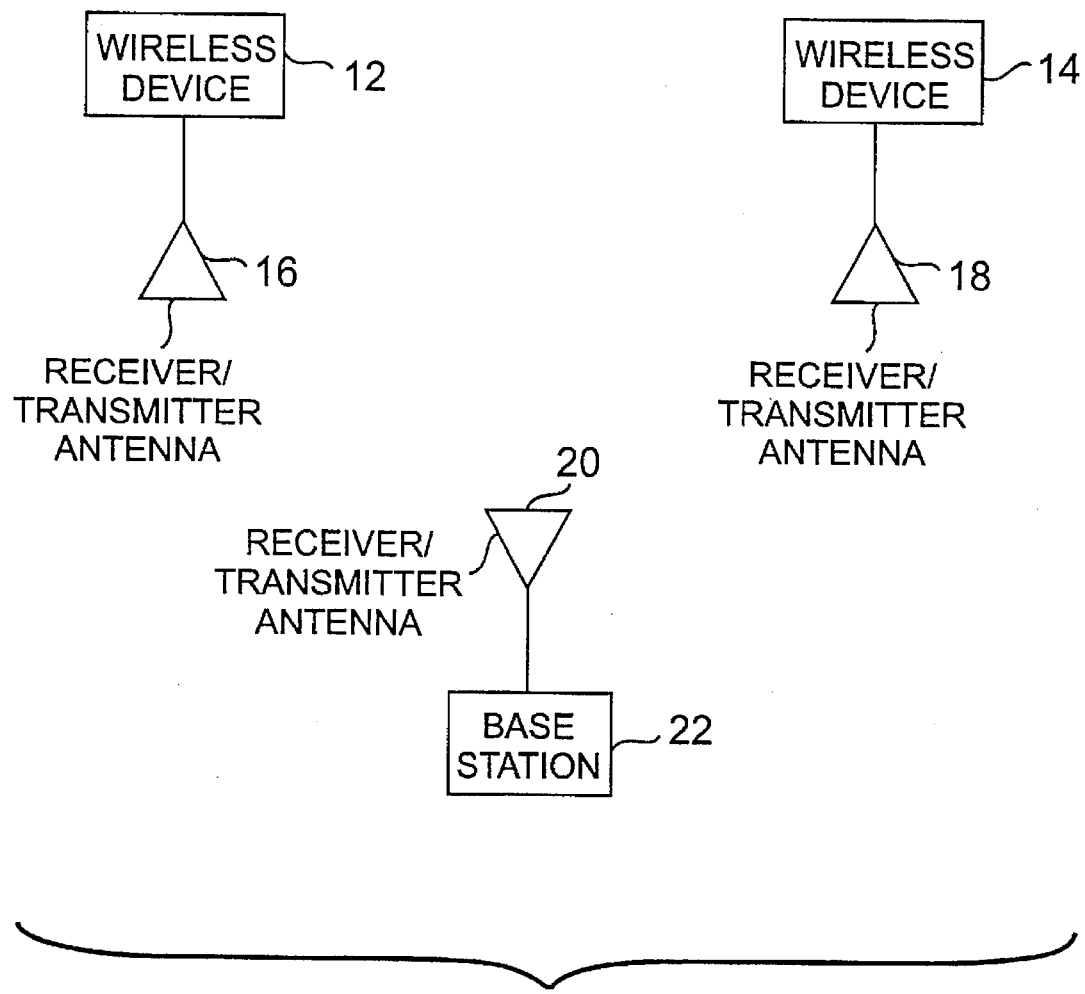
FIG. 1 is a schematic representation of a base station and two wireless devices.

FIG. 1 is a simple illustration of two wireless devices 12 and 14 and a base station 22. The wireless devices 12 and 14 include receiver/transmitter antennas 16 and 18 respectively. Base station 22 includes a receiver/transmitter antenna 20. FIG. 1 will be used in conjunction with FIGS. 2A–2E to describe known techniques for transmission and reception of power from wireless devices with CDMA spreading and without CDMA spreading. Details of a base station and wireless device in accordance with the present invention will be described later.

The wireless devices 12 and 14 transmit access request signals via receiver/transmitter antennas 16 and 18, respectively, and the access request signals are received by the receiver/transmitter antenna 20 of the base station 22. If both wireless devices 12 and 14 are given access to an uplink frequency channel of the base station 22 then wireless devices 12 and 14 transmit data signals to the base station 22.

FIGS. 2A–2E show power spectral density functions at the receiver/transmitter antenna 20 of the base station 22 of FIG. 1. Power spectral density $P(\omega)$, is shown graphed on the y-axis and frequency in radians, $\omega$, is shown graphed on the x-axis.

Figure 2A:
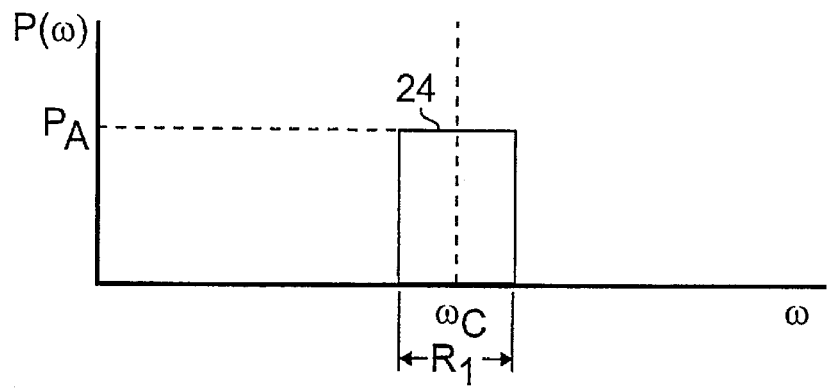
FIG. 2A illustrates a power spectral density function at a base station's receiver/transmitter antenna due to one wireless device transmitting data without spreading.

FIG. 2A illustrates the power spectral density function 24 at the receiver/transmitter antenna 20 of FIG. 1 due to data transmission by the wireless device 12 when spreading is not used. The power spectral density function 24 of FIG. 2A has a power spectral density $P(\omega)=P_A$ at frequencies in the bandwidth $\omega_c \pm (R_1/2)$, where $\omega_c$ is the carrier frequency and $R_1$ is the data rate of the wireless device 12. The power received from wireless device 12 at receiver/transmitter antenna 20 equals $P_A$ times the data rate $R_1$.

Figure 2B:
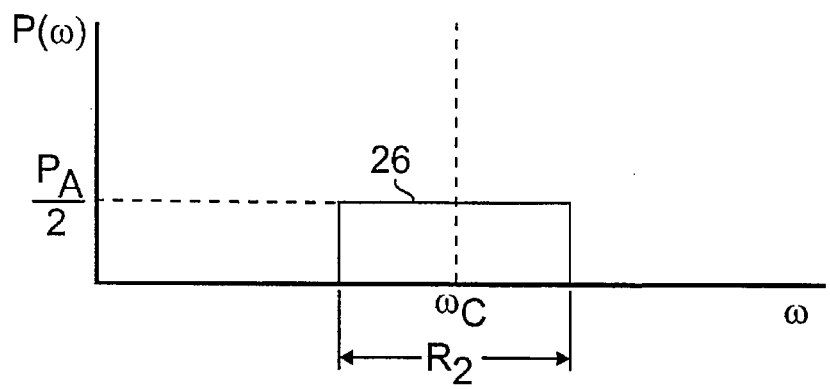
FIG. 2B illustrates a power spectral density function at a base station's receiver/transmitter antenna due to another wireless device transmitting data without spreading.

Similarly, FIG. 2B illustrates the power spectral density function 26 at the receiver/transmitter antenna 20 of the base station 22 of FIG. 1 due to the wireless device 14 when spreading is not used. The power spectral density function 26 of FIG. 2B has a power spectral density $P(\omega)=P_A/2$ at frequencies in the bandwidth $\omega_c \pm (R_2/2)$, where $\omega_c$ is the carrier frequency and $R_2$ is the data rate of the wireless device 14 of FIG. 1. The power received equals $P_2/2$ times the data rate $R_2$. In this instance the data rate of wireless device 14, which is $R_2$, is twice the data rate of wireless device 12, which is $R_1$.

Figure 2C:
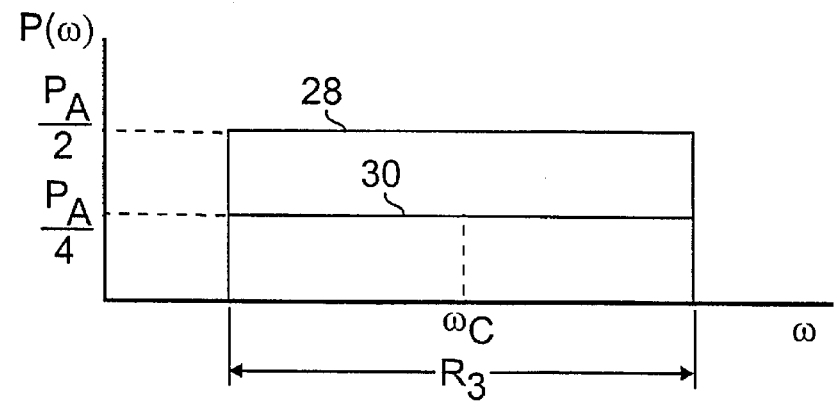
FIG. 2C illustrates a composite power spectral density function and a partial power spectral density function at a base station's receiver/transmitter antenna due to transmission by two wireless devices after spreading.

FIG. 2C illustrates a composite power spectral density function 28 at the base station receiver/transmitter 20 due to wireless devices 12 and 14 both transmitting data signals at a spreading rate of $R_3$. FIG. 2C further illustrates a partial power spectral density function 30 at the receiver/transmitter 20 of base station 22 due to the wireless device 12 transmitting a data signal at the spreading rate of $R_3$, where $R_3=2R_2=4R_1$. The composite power spectral density function 28 of FIG. 2C comprises the partial power spectral density function 30 due to the wireless device 12, which has power spectral density $P(\omega)=P_A/4$ at frequencies in the bandwidth $\omega_c \pm R_3/2$, where $\omega_c$ is the carrier frequency and $_3$ the spreading bandwidth. The total power received at receiver/transmitter 20 equals $P_A/2$ times the spreading bandwidth $R_3$. The composite power spectral density function 28 of FIG. 2C further comprises the partial power spectral density function due to the wireless device 14, which has a power spectral density $P(\omega)=P_A/2-(P_A/4)=(P_A/4)$ at frequencies in the bandwidth $\omega_c \pm (R_3/2)$. The power spectral density functions due to each wireless device are added together to form the composite power spectral density function 28 in FIG. 2C. The composite power spectral density function 28 has power spectral density $P(\omega)=P_A/2$ at frequencies in the bandwidth $\omega_c \pm (R_3/2)$.

The spreading operation takes place inside each wireless device and causes all signals to be spread over the same bandwidth or spreading rate, $R_3$. The bandwidth of the signal transmitted from the wireless device 12 is spread to four times its data rate and the bandwidth of the signal transmitted from the wireless device 14 is spread to two times its data rate. Typically, when CDMA spreading is used, the majority of wireless devices will have their data signals spread over a much larger bandwidth. The spreading factor F of the base station is the spreading bandwidth divided by a minimum reference data rate. In this case, $F=R_3/R_1=4$.

After spreading, each signal is transmitted from its respective wireless device. The composite spread signal ("CS"), the power spectral density function 28 of which is shown in FIG. 2C, is received by the base station 22 in FIG. 1 via its receiver/transmitter antenna 20. At the base station 22, composite spread signals are partially despread by the use of unique codes which identify particular wireless devices. Each unique code corresponds to the code used at the particular wireless device for spreading. The unique code transforms the signal transmitted from a particular wireless device to prespreading form. However, signals from all other wireless devices remain in their spread form. The effect of despreading of a signal from the wireless device 12 while the signal from the wireless device 14 remains spread is shown in FIG. 2D.

Figure 2D:
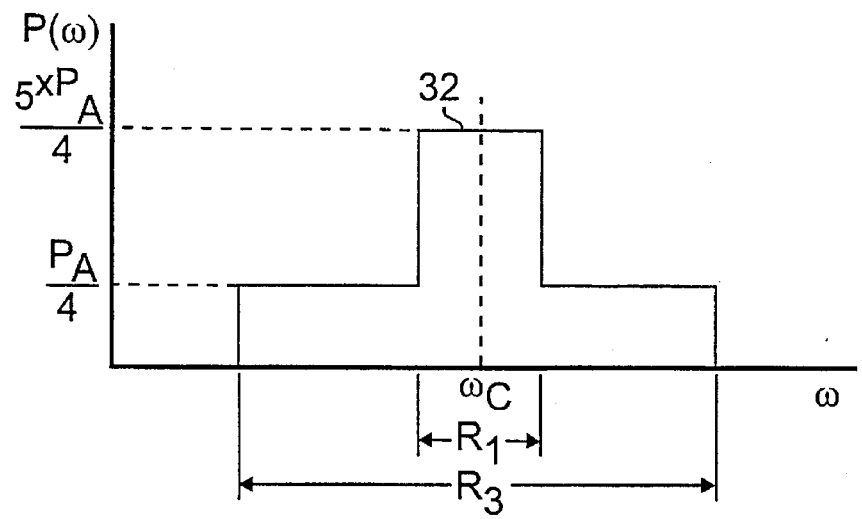
FIG. 2D illustrates conceptually a composite power spectral density function at a base station after partial despreading using a code for one wireless device.

FIG. 2D conceptually illustrates a composite power spectral density function 32 after partial despreading of the signal received by receiver/transmitter 20 of base station 22 by the unique code for wireless device 12. Composite power spectral density function 32 is similar in shape to power spectral density function 24 for wireless device 12 of FIG. 2A. The partial despreading causes the data signal from the wireless device 12 to have a power advantage over the data signal from the wireless device 14 and noise. This allows the data signal from wireless device 12 to be extracted. The power advantage is proportional to the spreading bandwidth, $R_3$, divided by the data rate for the wireless unit 12, $R_1$, which is $R_3/R_1=4$.

Figure 2E:
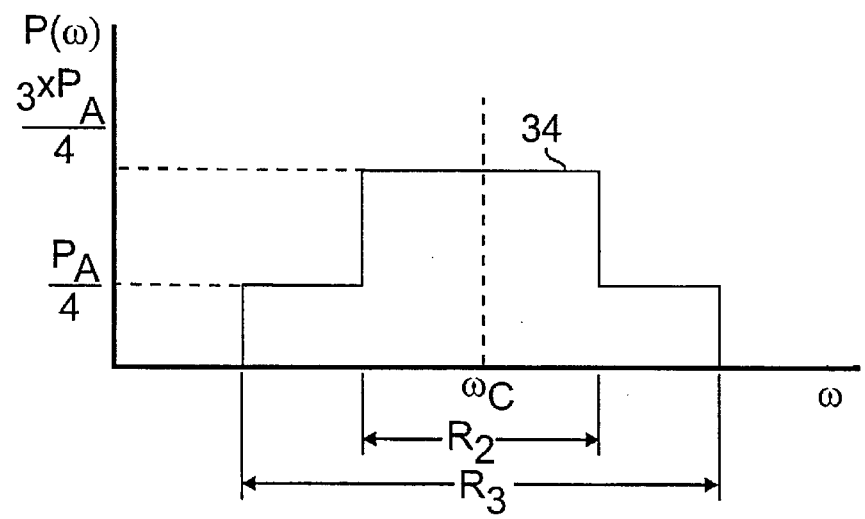
FIG. 2E illustrates conceptually a composite power spectral density function at a base station after partial despreading using a code for another wireless device.

FIG. 2E conceptually illustrates a composite power spectral density function 34 after partial despreading of the signal received by receiver/transmitter 20 of base station 22 by the unique code for wireless device 14. Composite power spectral density function 34 is similar to power spectral density function 26 in FIG. 2B for wireless device 14. The wireless device 14 has a power advantage proportional to $R_3/R_2=2$.

As can be seen from FIGS. 2D and 2E, wireless devices with lower data rates have greater power advantages than wireless devices with higher data rates. This greater power advantage results in greater quality of service for wireless devices with lower data rates. One aspect of the present invention controls the power received from wireless devices so that power advantages are equalized for devices having different data rates but the same quality of service requirements.

In the present invention, the power transmitted by wireless devices with higher data rates is controlled so that the power received at the base station from a particular wireless device divided by a reference power is proportional to the data rate of that particular wireless device divided by a minimum reference data rate. The following formula is preferably satisfied: $P/P_{min}=R/R_{min}$, where P is the power received due to the particular wireless device, $P_{min}$ is a reference minimum power level, R is the data rate of the particular wireless device, and $R_{min}$ is a minimum reference data rate.

Figure 3:
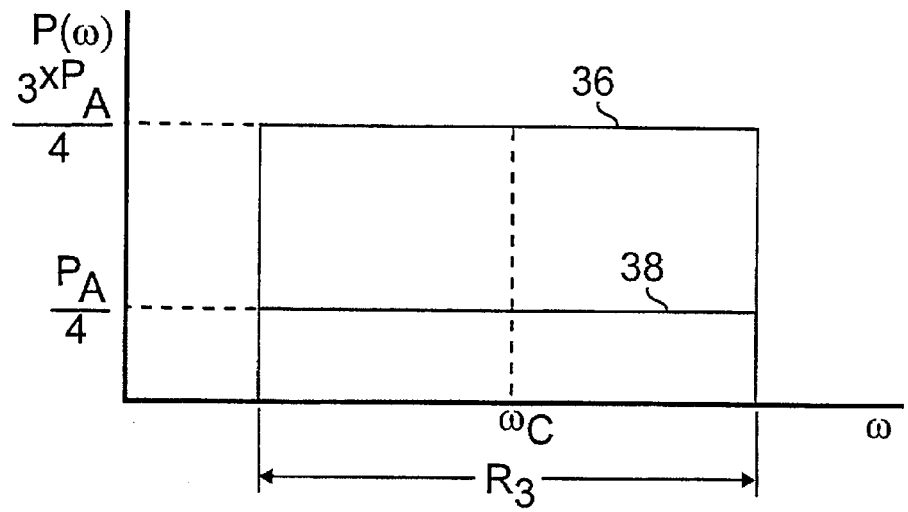
FIG. 3 illustrates a composite power spectral density function and a partial power spectral density function at a base station's receiver/transmitter antenna due to transmission by two wireless devices after spreading and power control in accordance with the present invention.
Figure 4:
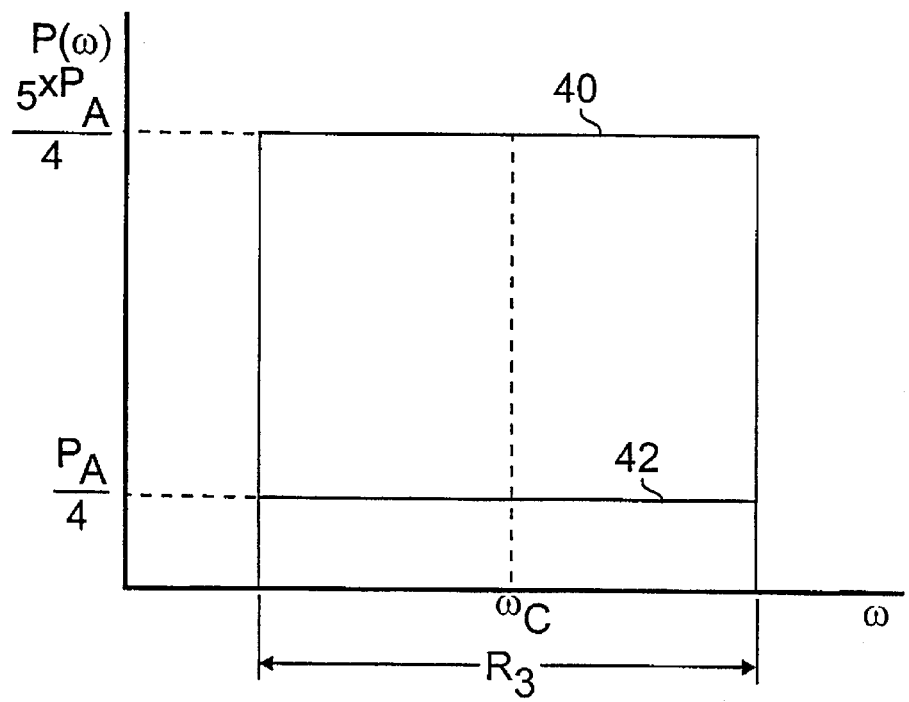
FIG. 4 illustrates a composite power spectral density function and a partial power spectral density function at a base station's receiver/transmitter antenna due to transmission by two wireless devices after spreading and power control in accordance with the present invention where the wireless devices have differing quality of service requirements.

FIGS. 1, 3, and 4 will be used to explain power control in accordance with the present invention. In FIG. 3, the composite power spectral density function 36 at the receiver/transmitter 20 of the base station 22 due to transmission by the wireless devices 12 and 14 of FIG. 1 after power control is shown. The partial power spectral density function 38 due to the wireless device 12 after power control is also shown. The power transmitted by wireless device 14 has been controlled such that the power received at the receiver/transmitter antenna 20 of the base station 22 due to wireless device 14 is twice that of the reference minimum power level, which in this case is the power received from the wireless device 12. The power received from the wireless device 14 is equal to $3P_A/4-P_A/4=P_A/2$ times the bandwidth $R_3$ and the power received from wireless device 12 is $P_A/4$ times the bandwidth $_3$. In this manner the power advantage obtained after despreading can be equalized for the wireless devices 12 and 14. The following formula is preferably satisfied: $P_2/P_1=R_2/R_1=2$, where $P_1$ and $P_2$ are the power levels received at the receiver/transmitter antenna 20 of the base station 22 from the wireless devices 12 and 14, respectively. $R_2$ is the data rate of the wireless device 14 and $R_1$ is the data rate of the wireless device 12.

The doubling of the power received from the wireless device 14 of FIG. 1 permits the same quality of service requirement to be satisfied for both wireless devices 12 and 14. In this case, satisfying the same quality of service requirement is preferably defined as satisfying the same signal to interference ratio.

A similar power control technique is preferable for wireless devices having the same data rate but different quality of service requirements. Assuming the wireless devices have the same data rates, the ratio of the power received from a particular wireless device divided by a reference minimum power level is preferably equal to the ratio of the quality of service required by the particular wireless device divided by the minimum quality of service required. In other words, the following formula is preferably satisfied: $P/P_{min}=QOS/QOS_{min}$, where P is the power received from a particular wireless device; $P_{min}$ is the reference minimum power level; QOS is the quality of service requirement for the particular wireless device; and $QOS_{min}$ is the minimum quality of service reference level.

The power control technique of the present invention permits wireless devices with the same data rates and different quality of service requirements to be controlled to achieve their respective quality of service requirements. While FIG. 3 was described for differing data rates and the same quality of service requirements, the results are analogous for differing quality of service requirements and the same data rates. For example, if the data rate of the wireless devices 12 and 14 is the same but the quality of service required by the wireless device 14 is twice that of the wireless device 12, the desired power levels shown in FIG. 3 would be the same. The power transmitted by wireless device 14 would be controlled such that the power received from the wireless device 14 is twice the reference minimum power level.

FIG. 4 illustrates the power received at receiver/transmitter antenna 20 of the base station 22 of FIG. 1 when both quality of service and data rate requirements differ. In this case, it is assumed that the wireless device 14, which has a data rate twice that of the wireless device 12, also has a quality of service requirement twice that of the wireless device 12. In other words, device 14 requires a 3 dB higher signal to interference ratio than device 12 for comparable quality of service. Accordingly, the power received at the receiver/transmitter antenna 20 from the wireless device 14 should be four times the power received from the wireless device 12. Thus, the power transmitted by wireless device 14 is controlled such that the power received from the wireless device 14 is $5/4*P_A-P_A/4=P_A$ times the bandwidth $R_3$ and the power transmitted from wireless device 12 is controlled such that the power received from wireless device 12 is $P_A/4$ times the bandwidth $R_3$. In general, the following formula should be satisfied for wireless devices with different data rates and different quality of service requirements: $P/P_{min}=R/R_{min}*QOS/QOS_{min}$. P is the power received due to a particular wireless device. R and QOS are the data rate and quality of service requirements, respectively, of a particular wireless device. $P_{min}$, $R_{min}$, and $QOS_{min}$ are the minimum power level, minimum data rate and minimum quality of service requirement, respectively.

Figure 5:
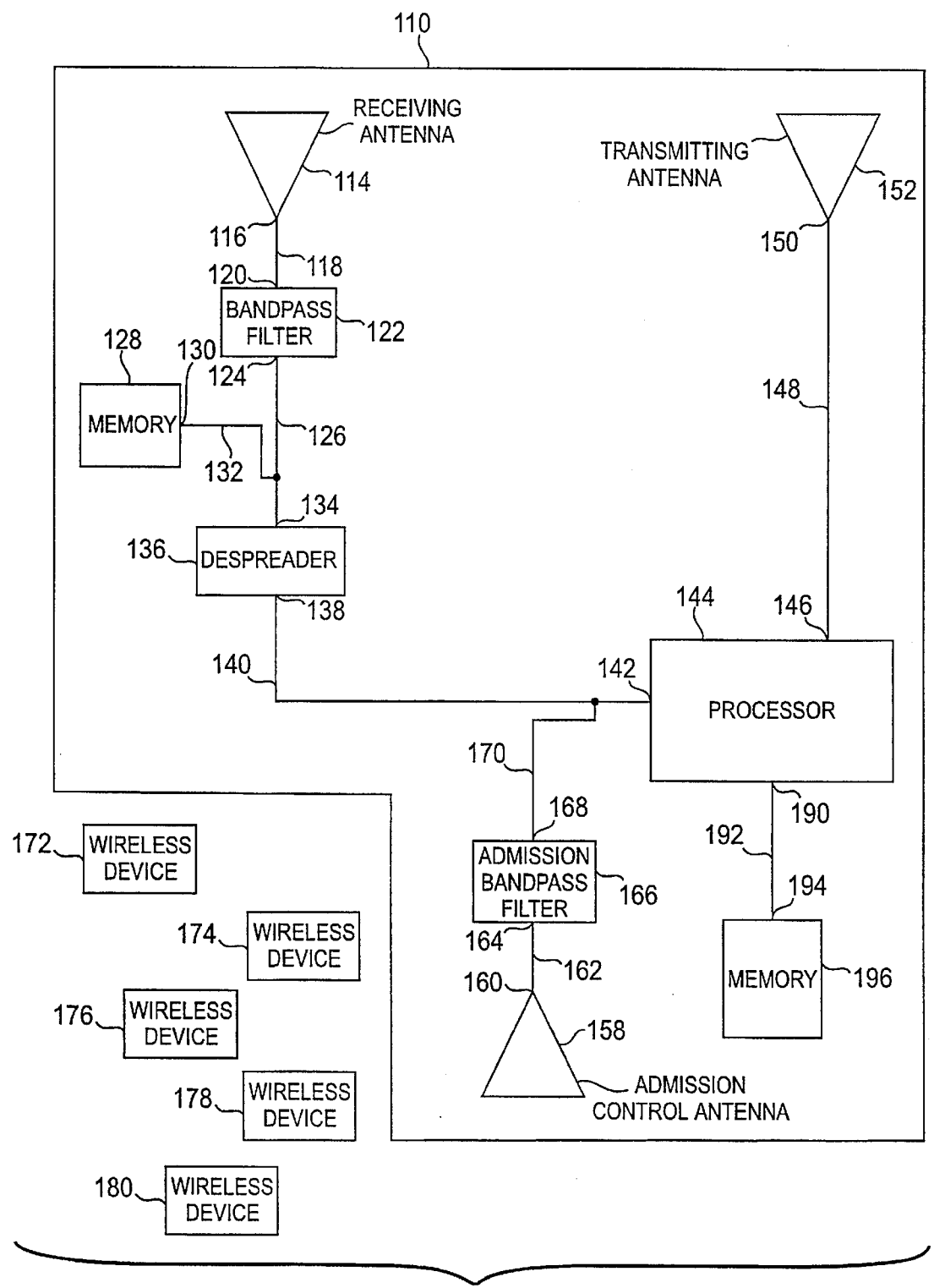
FIG. 5 is a schematic of a base station which controls the power transmitted by wireless devices in accordance with the present invention.

FIG. 5 illustrates a base station 110 in accordance with the present invention and a plurality of wireless devices 172, 174, 176, 178, and 180. The base station 110 comprises a receiving antenna 114, a bandpass filter 122, a memory 128, a despreader 136, a processor 144, a transmitting antenna 152, an admission control antenna 158, an admission bandpass filter 166, and a memory 196.

The receiving antenna 114 is connected via its output 116 and conductor 118 to an input 120 of the bandpass filter 122. The bandpass filter 122 is connected via its output 124 and conductor 126 to input/output 134 of the despreader 136. The memory 128 is connected via its input/output 130 and conductor 132 to an input/output 134 of the despreader 136, which is connected via an output 138 and a conductor 140 to an input 142 of the processor 144. The processor 144 is connected via its output 146 and the conductor 148 to an input 150 of the transmitting antenna 152. The admission control antenna 158 is connected via its input/output 160 and the conductor 162 to input/output 164 of the admission bandpass filter 166 which is connected via its input/output 168 and a conductor 170 to an input 142 of the processor 144. The memory 196 is connected via its input/output 194 and a conductor 192 to an input/output 190 of the processor 144.

The base station of FIG. 5 controls the power of a wireless device such as one of the wireless devices 172, 174, 176, 178 or 180 in the following manner in accordance with the present invention. A composite spread signal ("CS") corresponding to all transmitting wireless devices is received at the receiving antenna 114 and sent via the output 116 and the conductor 118 to the input 120 of the bandpass filter 122. The filter 122 is set to the bandwidth of the uplink frequency channel. A filtered composite spread signal ("FCS") is produced at the output 124 and sent via the conductor 126 to the input/output 134 of the despreader 136. The despreader 136 preferably demodulates the FCS signal and stores the demodulated composite spread signal ("DCS") in the memory 128 via the input/output 134, the conductor 132 and the input/output 130.

After storing the DCS signal the despreader 136 retrieves a code $C_n$ for a particular wireless device from the memory 128, via its input/output 130, the conductor 132 and the input/output 134 of the despreader 136. For example, the code $C_n$ may identify the wireless device 172. The despreader 136 uses the code $C_n$ to partially despread the DCS signal to form a partially despread signal ("PDS"). The PDS signal is used to determine if the particular wireless device 172 is transmitting. If the PDS signal is less than a threshold, wireless device 172 is not transmitting and the despreader 136 retrieves the next code, $C_{n+1}$, which for example may be the code identifying the wireless device 174. Despreading techniques are known in the art. See, for example, Pickholtz, Schilling and Milstein, "Theory of Spread-Spectrum Communications—A Tutorial," IEEE Trans. Communications, Vol. Com-30, No. 5, pp. 855–884, May 1982.

If the PDS signal is greater than a threshold, the PDS signal is assumed to approximate a pre-spread data signal from the wireless device 172. The PDS signal is then sent to the processor 144 via the despreader's output 138, the conductor 140, and the processor's input 142. The processor 144 preferably stores the data rate of the PDS signal in the memory 196 via the input/output 190, the conductor 192 and the input/output 194.

The code $C_n$ used to produce the PDS signal is preferably also sent to the processor 144 by the despreader 136 to identify wireless device 172. The processor 144 receives the PDS signal and the unique code $C_n$, corresponding to the wireless device 172, at the input 142 and determines the quality of service requirement for this wireless device based on the code $C_n$. The quality of service requirement for each wireless device or for a type of wireless device is preferably stored in the memory 196. The quality of service requirement can be retrieved by the processor 144 via the input/output 190 the conductor 192 and the input/output 194 of the memory 196.

The processor 144 uses the data rate which can be determined from the PDS signal and the quality of service requirement which is stored in the memory 196 to determine a power factor PF by which the power received from the wireless device 172 should exceed the reference minimum power level $P_{min}$. Alternatively, the data rate can be determined from the code $C_n$. The reference minimum power level $P_{min}$ is the power desired to be received from a hypothetical or actual wireless device which has the lowest data rate and the lowest quality of service requirement. The power factor is preferably determined by the following formula: $PF = QOS/QOS_{min} * R/R_{min}$, where QOS and R are the quality of service and data rate requirements for wireless device 172, and $QOS_{min}$ and $R_{min}$ are the minimum quality of service and data rate requirements.

After the power factor PF is determined, a power control signal is sent from the processor 144 via the output 146 and the conductor 148, to the input 150 of the transmitting antenna 152 of FIG. 5. The power control signal preferably includes the unique code $C_n$ for identifying the wireless device 172. The transmitting antenna 152 transmits the control signal to wireless devices generally. The wireless device 172 extracts the code $C_n$, determines that the code $C_n$ is its identification code and adjusts or controls the power it transmits based on the control signal.

The power control signal from the base station 110 can continually ask a wireless device, such as wireless device 172, to increase its power until the power factor at the receiving antenna 114 of the base station 110 is satisfied. The power control operation can also be a tuning process in which incremental increases or decreases in power are requested until the power received at the receiving antenna 114 is within a specified limit. Other known techniques for requesting increases in power and ensuring compliance with power requirements can be used.

The admission control antenna 158 and the admission control bandpass filter 166 are used to receive admission requests from the wireless devices on a separate admission frequency channel. Alternatively, frequency changing means can be employed with the bandpass filter 122 so that admission requests and data transmissions can occur with the same transmitting/receiving antenna. In fact, in many systems, admission control is accomplished with the same antenna as data transmission. Admission control techniques are known in the art. Admission by the base station 110 of a wireless device effectively registers that wireless device as a member of the base station's population. Admission does not permit the wireless device to transmit data but rather makes the wireless device eligible to request the ability to transmit data, which is also called requesting access, at some future time. The admission of a particular wireless device can be registered in the memory 196.

Figure 6:
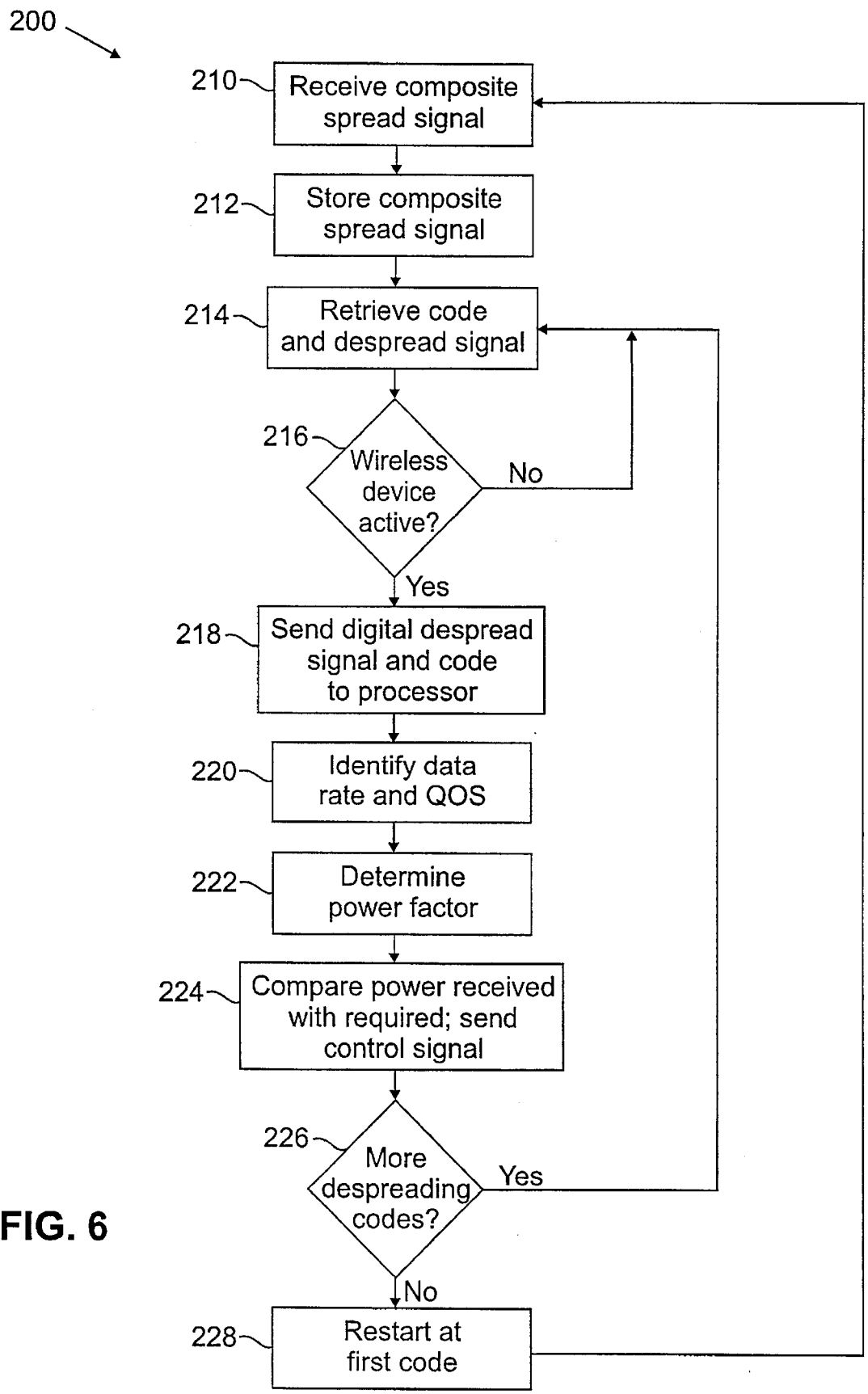
FIG. 6 is a flow chart of a method for controlling the power transmitted by wireless devices.

FIG. 6 is a flow chart 200 illustrating a method according to the present invention for controlling power from wireless devices which have different data rates and/or quality of service requirements.

A composite spread signal is received by a receiving antenna, such as the receiving antenna 114 of FIG. 5, at step 210. The composite spread signal ("CS") contains spread signals transmitted by a plurality of wireless devices, such as the wireless devices 172, 174, 176, 178, and 180 of FIG. 5, and is stored preferably in demodulated form in a memory, such as the memory 128 of FIG. 5, at step 212. A despreading code ("$C_n$"), which identifies a particular wireless device, for example the wireless device 172, and which is stored in a memory, such as the memory 128, is retrieved from the memory 128 in step 214 by a despreader, such as the despreader 136 of FIG. 5. The despreading code is used to partially despread the CS signal to form a partially despread ("PDS") signal. The base station may alternatively have multiple despreaders and/or processors that can process multiple codes in parallel.

The despreader 136 at step 216 determines if the wireless device 172 is currently transmitting data or is "active". If the wireless device is not active, the method loops back and retrieves the unique code ($C_{n+1}$) for the next wireless device, for example, wireless device 174, from the memory at step 214. If the wireless device 172 is active, the PDS signal will be sent along with the identifying code $C_n$, to a processor, such as processor 144 in FIG. 5, at step 218. The code and the PDS signal indicate the data rate and the quality of service required for the wireless device 172. Alternatively the code alone may be used to identify data rate and quality of service requirements. A processor, such as the processor 144 in FIG. 5, receives the code and the PDS signal and determines the data rate and quality of service requirements at step 220. The data rate and the quality of service requirements are used to determine a power factor at step 222. The power factor preferably satisfies the formula: $PF=QOS/QOS_{min}*R/R_{min}$.

The processor then compares the received power from the wireless device 172 with the power required. If an increase or decrease in power is required, an appropriate control signal is sent in step 224. The control signal may request an incremental power increase or decrease so that through multiple iterations the received power from the wireless device comes within the limits required by the wireless device's power factor PF. Alternatively, the control signal may request a single power increase or decrease to satisfy the power factor requirement.

At step 226 the despreader determines if there are any despreading codes ($C_{n+1}$, ...) left to examine. For example, if only the code for the wireless device 172 in FIG. 5 has been examined, the unique codes for the wireless devices 174, 176, 178, and 180 would still need to be cycled through. If there are further codes to examine, the method 200 loops back to step 214 to retrieve the next code. If there are no spreading codes left to examine the method restarts at the first despreading code and goes back to step 210 to receive a new composite spread signal.

Figure 7:
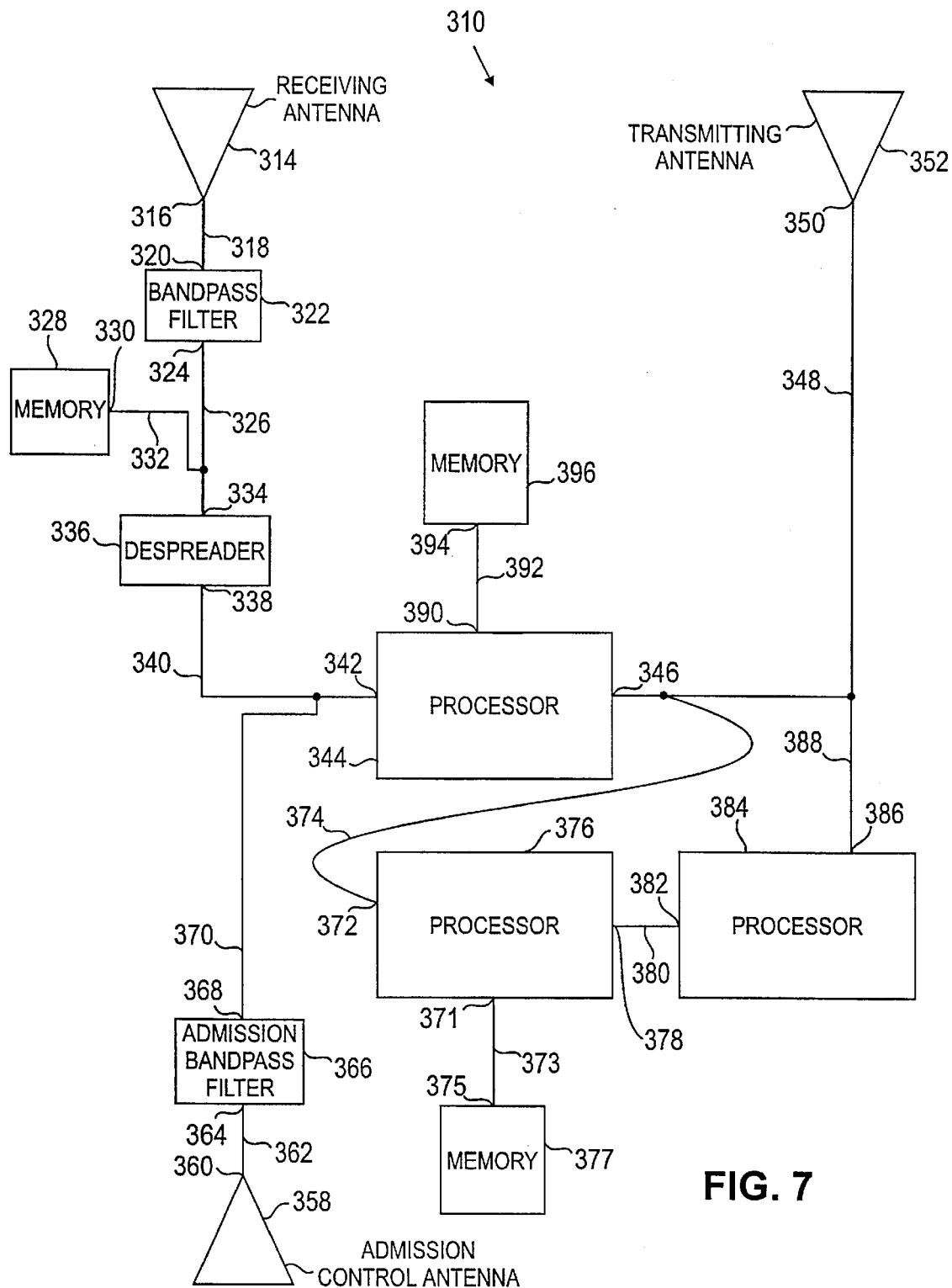
FIG. 7 is a schematic of a base station which controls the power transmitted by wireless devices and generates probability and/or load and population data for transmission to wireless devices.

FIG. 7 is a schematic of another embodiment of a base station 310 in accordance with the present invention. The base station 310 comprises a receiving antenna 314, a bandpass filter 322, a memory 328, a despreader 336, a processor 344, a transmitting antenna 352, an admission control antenna 358, an admission bandpass filter 366, and a memory 396. These components are analogous to similar components in base station 110 in FIG. 5. The base station 310 additionally comprises a processor 376, a memory 377, and a processor 384.

The receiving antenna 314 is connected via its output 316 and the conductor 318 to the input 320 of the bandpass filter 322. The bandpass filter 322 is connected via its output 324 and the conductor 326 to the input/output 334 of the despreader 336. The memory 328 is connected via its input/output 330 and a conductor 332 to the input/output 334 of the despreader 336, which is connected via its output 338 and the conductor 340 to the input 342 of the processor 344. The processor 344 is connected via its output 346 and the conductor 348 to the input 350 of the transmitting antenna 352. The admission control antenna 358 is connected via its output 360 and the conductor 362 to the input 364 of the admission bandpass filter 366, which is connected via its output 368 and the conductor 370 to the input 342 of the processor 344. The processor 344 is connected via its output 346 and the conductor 374 to an input 372 of the processor 376. The processor 376 is connected via its output 378 and the conductor 380 to the input 382 of the processor 384, which is connected via its output 386 and the conductors 388 and 348 to the input 350 of the transmitting antenna 352. The processor 344 is connected via the input/output 390 and the conductor 392 to the input/output 394 of the memory 396. The processor 376 is connected via the input/output 371 to the conductor 373 and the input/output 375 to the memory 377.

The power control operation of the base station 310 is similar to the power control operation of the base station 110 which has previously been described with reference to FIG. 5. The operation of the processors 376 and 384 of the base station 310 will now be described.

The processor 376 receives the data rate and quality of service requirement data from the processor 344 via the output 346, conductor 374, and the input 372. The processor 376 preferably stores current load values ($k_i$, $k_{i+1}$ ...) in the memory 377 and the current load values for this particular type of wireless device $k_i$ is updated via the output 371, the conductor 373 and the input 375 of the memory 377, if necessary. The current load, $k_i$, is the number of active wireless devices of a type i where the type is determined by the data rate and the quality of service requirement.

The total wireless device population of a type i, $n_i$, admitted at this base station, is updated upon admission of a new wireless device of type i. Admission occurs at some time prior to access and $n_i$ is updated after admission in memory 377 by processor 376. Admission may occur on a separate frequency channel such as that determined by the admission filter 366 in FIG. 7, or on the same frequency channel using a reserved despreading code or codes, by techniques known in the art. An admission request or registration signal is received at the admission antenna 358. The signal is subsequently sent through the admission bandpass filter 366 via the admission antenna output 360, the conductor 362 and the input 364. Finally, an admission request is received at the processor 344 via the output 368, the conductor 370, and the input 342.

The parameters $k_i$, $K_{i+1}$, ... and $n_i$, $n_{i+1}$ ... are used to calculate an equivalent current load value K and an equivalent population value N according to the following formulas.

$$K = \sum_i \frac{R_i}{R_{min}} \frac{QOS_i}{QOS_{min}} k_i$$

-continued
$$N = \sum_i \frac{R_i}{R_{min}} \frac{QOS_i}{QOS_{min}} n_i$$

In the above equations, each $$\left( \frac{R_i}{R_{min}} \frac{QOS_i}{QOS_{min}} n_i \right)$$

value is a population share $N_i$ for devices or type i. Each $$\left( \frac{R_i}{R_{min}} \frac{QOS_i}{QOS_{min}} k_i \right)$$

value is a current load share $K_i$ value for devices of type i. The sum of the populations shares ($N_i$, $N_{i+1}$ ... ) equals the equivalent population $N_i$. The sum of the current load shares ($K_i$, $K_{i+1}$ ... ) equals the equivalent current load. The equivalent current load value, K, and equivalent population value, N, calculations are based on the principal that wireless devices with higher data rates and/or higher quality of service requirements effectively act as a proportionately higher number of wireless devices by taking up a larger amount of the available power.

The processor 376 sends the parameters K and N via the output 378 and the conductor 380 to the input 382 of the processor 384. The processor 384 then determines the probability of transmission values for the wireless devices, such as the wireless device 172 of FIG. 5, from the principle that the expected value of the equivalent current load at a time t+T, $K_{exp}$, should be less than F. The expected value of the equivalent current load at a time t+T is preferably estimated based on the equivalent current load K at time t and a doubly stochastic Poisson probability function.

For a base station servicing wireless devices with the same data rate and the same quality of service requirement the following equation is used:

$$K_{exp} \leq F$$

or $$(N-K)(1-e^{-T/\tau_0}) P_t + K^{-T/\tau_1} P_{rt} \leq F.$$

The expression on the left of the "$\leq$" sign represents $K_{exp}$ at time t+T. The expression $(N-K)(1-e^{-T/\tau_0}) P_t$ represents the equivalent number of wireless devices which were not active but which will become active after time delay T. T is the roundtrip time delay from transmission of a data signal from an active wireless device to reporting that transmission to another wireless device. The expression $K^{-T/\tau_1} P_{rt}$ represents the equivalent number of wireless devices which were transmitting and will continue to transmit after time delay T. $P_t$ is the probability of a new transmission and $P_{rt}$ is the probability of continuing an ongoing transmission. The expression (N−K) represents the equivalent number of wireless devices which are not currently transmitting. K represents the equivalent number of wireless devices which are transmitting at time t. The expression $(1-e^{-T/\tau_0})$ represents the stochastic probability function that an inactive user will become active after time delay T. The expression $e^{-T/\tau_1}$ represents the stochastic probability function that an active user will stay active after the time delay T. F is again the spreading ratio of the bandwidth of the uplink frequency channel divided by the minimum data rate.

If it is assumed that $P_t$ is equal to $P_{rt\ then}$ $P_t$ and $P_{rt}$ can be solved for in the previous equation. $P_t$ can also be assumed to be a fraction of $P_{rt}$ so that a priority is given to ongoing transmissions. In either case, $P_t$ and subsequently $P_{rt}$ can be solved for known N, K, the time constants $\tau_0$ and $\tau_1$, and the time delay T.

The previous equation uses a doubly stochastic model for a wireless device which is transmitting as a bursty packetized source. The source is either in an ON state where packets are being transmitted to a base station or an OFF state when they are not. The probability of staying in the ON state after a particular time delay T is $e^{-T/\tau_1}$ and the probability of changing from the ON state to the OFF state in time delay T is $1-e^{-T/\tau_1}$. The probability of staying in the OFF state after time delay T is $e^{-T/\tau_0}$ and the probability of changing from the ON state to the OFF state is $1-e^{-T/\tau_0}$. Other modelling functions can be used to model the activity/ inactivity of a wireless device. The ratio of the average ON time of a wireless device to the sum of the average ON time and the average OFF time is generally known as the activity factor, $\beta_i$. For this model, $\beta_i = \tau_1/(T_1+T_0)$.

For a system comprising wireless devices with two different data rates or QOS requirements, the following expression can be derived, again using a doubly stochastic Poisson probability function:

$$K_{exp} \leq F$$

or $$(N_1 - K_1)(1 - e^{-T/\tau_{10}})P_{t1} + K_1 e^{-T/\tau_{11}}P_{rt1} + \frac{R_2}{R_1} \frac{QOS_2}{QOS_1} [(N_2 - K_2)(1 - e^{-T/\tau_{20}})P_{t2} + K_2 e^{-T/\tau_{21}}P_{rt2}] \leq F.$$

The expression on the left side of the "$\leq$" sign represents $K_{exp}$ at time t+T. $N_1$ and $N_2$ represent population shares for wireless devices with a first and second data rate, respectively. $K_1$ and $K_2$ represent current load shares for wireless devices with a first and second data rate, respectively. $P_{t1}$ and $P_{rt1}$, represent probabilities of new transmission and ongoing transmission, respectively, for devices with the first data rate. $P_{t2}$ and $P_{rt2}$ represent probabilities of transmission for devices with the second rate.

The equation above can be simplified by making the following assumptions:

$$\tau_1 = \max\{\tau_{11}, \tau_{21}\}$$

$$\tau_0 = \min\{\tau_{10}, \tau_{20}\}$$

For a system with more than two types of wireless devices, the appropriate equation can be simplified by the following assumptions:

$$\tau_1 \equiv \max_i \{\tau_{i1}\}$$

$$\tau_0 \equiv \min_i \{\tau_{i0}\}.$$

With these assumptions it is possible to send only the parameters K and N to wireless devices and allow those wireless devices to calculate their own probability of transmission value. Otherwise, all current load shares ($K_i$, $K_{i+1}$, ... ) and population shares ($N_i$, $N_{i+1}$, ... ) should be transmitted to the wireless devices if the probability of transmission value calculation is to be determined distributively at the wireless devices.

Wireless devices with particular data rates or quality of service requirements can be given priority over other types of wireless devices by setting one probability value equal to a factor times another probability value as was described for ongoing transmissions versus new transmissions.

The probability of transmission value is sent to a wireless device from the processor 384 in FIG. 7 via its output 386 and the conductors 388 and 348, to the input 350 of the transmitting antenna 352. The processor 384 preferably produces a probability signal in the form of a digitally modulated downlink carrier frequency signal for broadcasting to all the wireless devices of a particular type. The probability signal is transmitted from the antenna 352. Alternatively, the processor 376 can send the load data, in this instance comprising the equivalent current load value K and equivalent population value N, directly to the wireless device which can determine the probability of transmission value based on the load data.

Figure 8:
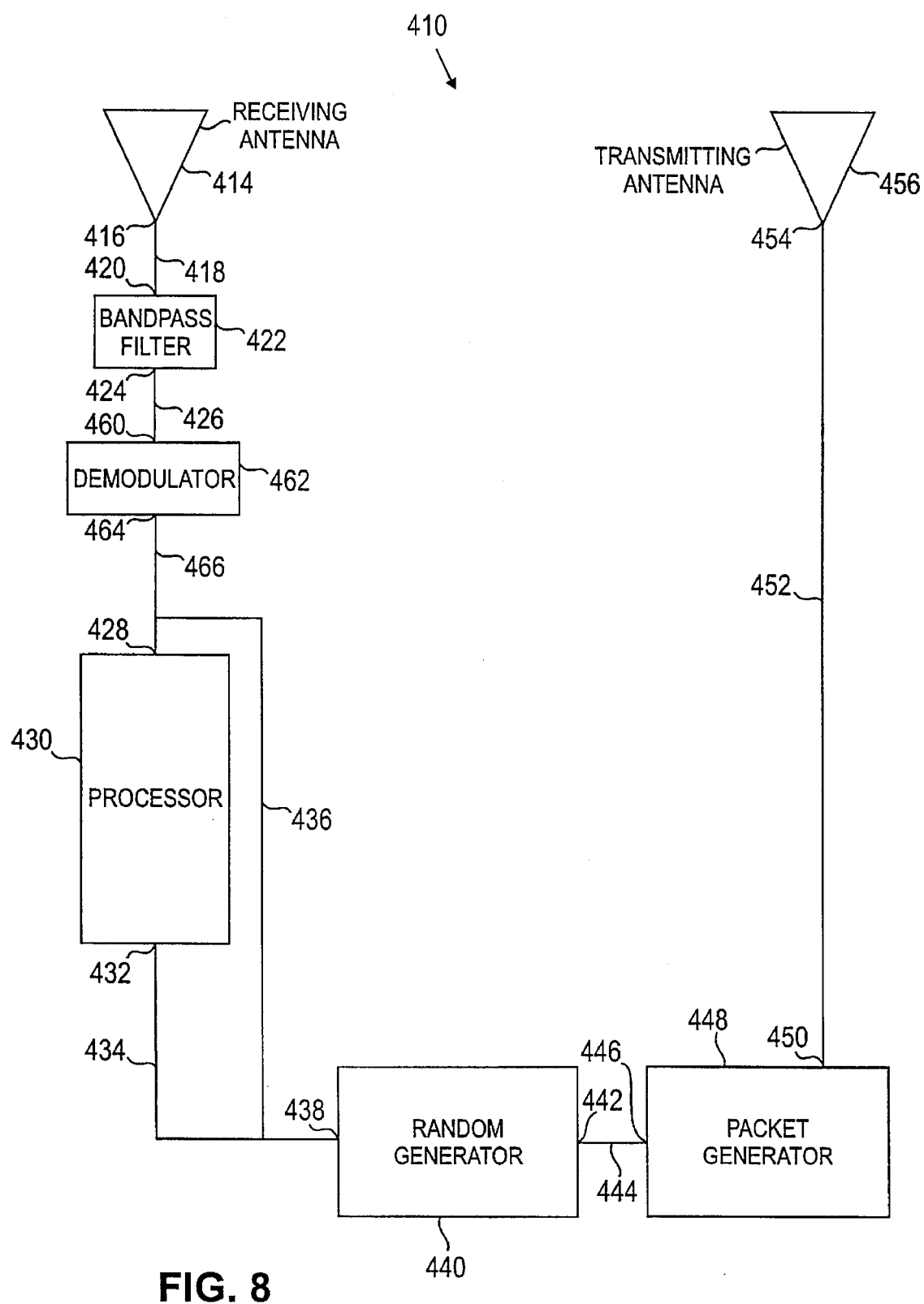
FIG. 8 is a schematic of a wireless device which uses probability values or load and population data values to control transmission of data.

FIG. 8 is a schematic of a wireless device 410 in accordance with the present invention. The wireless device 410 comprises a receiving antenna 414, a bandpass filter 422, a demodulator 462, a processor 430, a random generator 440, a packet generator 448 and a transmitting antenna 456.

The receiving antenna 414 is connected via its output 416 and the conductor 418 to the input 420 of the bandpass filter 422. The bandpass filter 422 is connected via its output 424, and the conductor 426 to the input 460 of the demodulator 462. The demodulator 462 is connected via its output 464 to the conductor 466 and an input 428 of the processor 430. The processor 430 is connected via its output 432 and the conductor 434 to an input 438 of the random generator 440. The demodulator 462 is connected via its output 464 and the bypass conductor 436 to an input 438 of the random generator 440 which is connected via its output 442 and the conductor 444 to an input 446 of the packet generator 448. The packet generator 448 is connected via its output 450 and the conductor 452 to the input 454 of the transmitting antenna 456.

In operation, a load data modulated signal and/or probability data modulated signal is received at the wireless device 410 from a base station, such as the base station 310 of FIG. 7, by receiving antenna 414. The modulated signal passes through the bandpass filter 422 via its input 420 and its output 424. The filtered signal is demodulated by the demodulator 462 and is sent via the output 464 and the conductor 466 to the input 428 of the processor 430. The processor 430 calculates a probability of transmission value for this wireless device based on the load data received. The load data will normally include an equivalent current load value K and an equivalent population value N, which have been described with reference to the base station of FIG. 7.

After the probability of transmission value for the wireless device 410 is determined by the processor 430, it is sent from the processor 430 via its output 432 and conductor 434 to the input 438 of the random generator 440. The random generator 440 produces a random number based on the given probability value and the random number determines if transmission from the wireless device 410 will occur at this particular time. If transmission should occur, the random generator 440 produces an enable signal at its output 442 and sends the enable signal to the packet generator 448 via conductor 444 and input 446. The packet generator 448 will then be enabled to send packets via its output 450 and the conductor 452 to input 454 of the transmitting antenna 456 for transmission. Alternatively, operations performed by processor 430, random generator 440, and packet generator 448 can be combined into a single processor.

Further, the signal from the demodulator 462 may be sent from its output 464 through the bypass conductor 436 directly to the input 438 of the random generator 440. This can occur if the base station is transmitting probability of transmission values instead of load data. Other than bypassing the processor 430, the remaining operation of the circuit of FIG. 8 would be as described previously.

Figure 9:
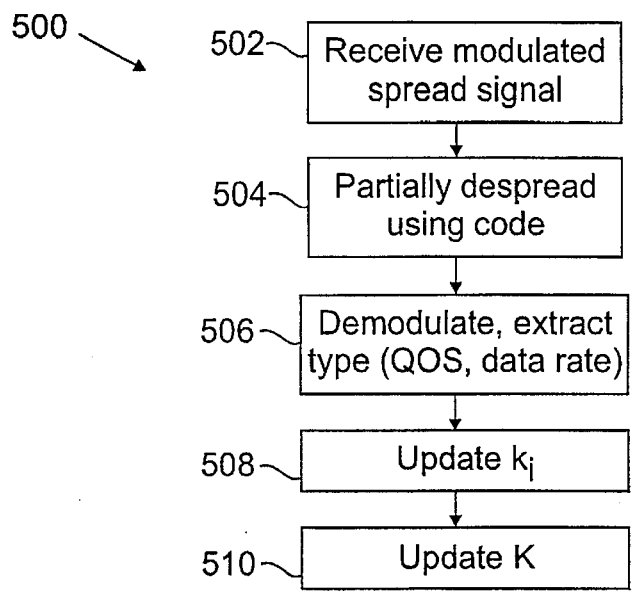
FIG. 9 is a flow chart for determining equivalent current load values.
Figure 10:
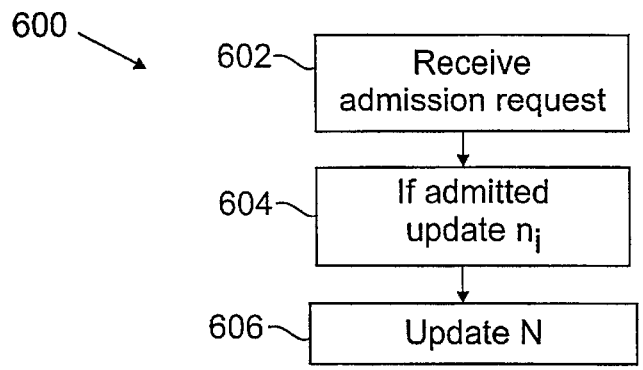
FIG. 10 is a flow chart for determining equivalent population values.
Figure 11:
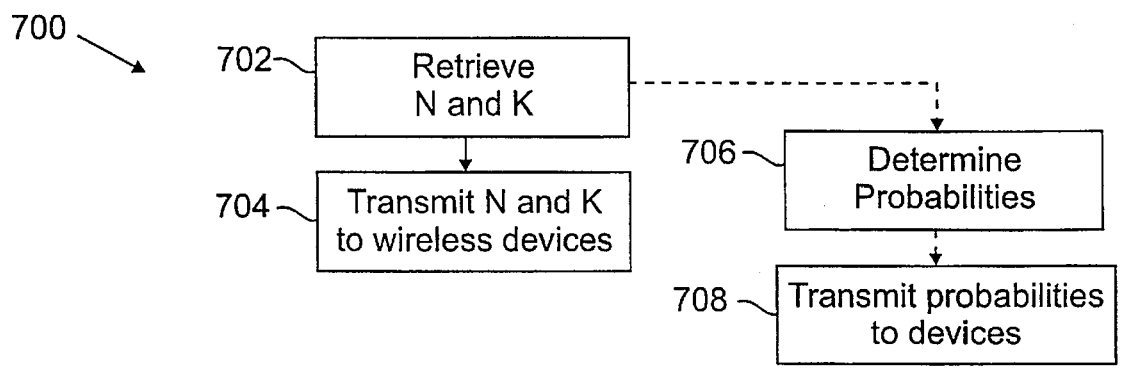
FIG. 11 is a flow chart for transmitting equivalent current load and equivalent population values or probability of transmission values to a wireless device.

Referring to FIGS. 9, 10, and 11, a method for statistically controlling transmission by wireless devices through a base station, such as the base station 310 of FIG. 7, is shown.

FIG. 9 is a flow chart 500 of the update operation of the equivalent current load value, K, which occurs when a wireless device transmits a modulated spread signal to the base station. The modulated spread signal is received at step 502 and is partially despread by a despreader, such as the despreader 336 in FIG. 7, using a unique code at step 504. The partially despread signal ("PDS") is then demodulated at step 506 and the data rate and quality of service requirements are determined from the demodulated signal and the code used for partial despreading. The value for the number of active wireless devices of type i, $k_i$ is stored in a memory, such as the memory 377 in FIG. 7, and is incremented if this is a new active wireless device, in step 508. The equivalent current load value K, also stored in memory, is then updated at step 510 based on the new value $k_i$ and the values ($k_{i+1}$, $k_{i+2}$, ...) and the data rate and quality of service requirements for all active wireless devices as previously described. Alternatively the equivalent current load value K can be updated independently of updates to a particular $k_i$ by sampling all $k_i$'s after particular intervals of time. In addition, current load shares $K_i$ can be calculated as previously described.

FIG. 10 is a flow chart 600 for the update operation of the equivalent population value N by a processor such as the processor 376 in FIG. 7. An admission request which includes the type of wireless device is received at step 602 via an admission receiver, such as the receiver 358 in FIG. 7. If the new wireless device is admitted, the population of that type of wireless device, $n_i$, is updated and stored in a memory such as the memory 377 at step 604. The new $n_i$, is then used to update the equivalent population value, N, which is also stored in the memory at step 606. Alternatively, the equivalent population value N can be updated independently of updates to a particular $n_i$ by a processor sampling all $n_i$'s in memory ($n_i$, $n_{i+1}$, ...) after particular intervals of time. Population shares $N_i$, can also be calculated as previously described.

FIG. 11 is a flow chart 700 for the transmission of load data or probability data in accordance with the present invention. Values for the equivalent population value N and the equivalent current load value K, are retrieved at step 702 by a processor such as the processor 376 from a memory, such as the memory 377 of FIG. 7. N and K can be transmitted to wireless devices at step 704 so that the wireless devices can determine the probability of transmission values. Optionally, the probability of transmission values can be determined by the base station at step 706 from N and K. The probabilities can then be transmitted to wireless devices at step 708.

The present invention provides the capability of adequately servicing wireless devices with different data and different quality of service requirements. The statistical access technique of the present invention provides for efficient use of a designated frequency spectrum wherein access to a base station can be prioritized for different types of wireless devices.

We claim:

1. A base station for controlling the power transmitted by a plurality of wireless devices of mixed types comprising:
    a transmitting antenna;
    a receiving antenna; and
    a processor for receiving a signal from the receiving antenna, for recognizing the type of a particular wireless device which is transmitting the signal, wherein the type of the particular wireless device is at least partially defined by the data rate of the particular wireless device, and for producing a control signal which is sent to and transmitted by the transmitting antenna, the control signal containing control data based on the recognized type of the particular wireless device which may be utilized by the particular wireless device to control the power transmitted to the base station by the particular wireless device.

2. The base station of claim 1 wherein the type of the particular wireless device is at least partially defined by the quality of service requirement of the particular wireless device.

3. The base station of claim 2 wherein the control signal controls the power transmitted by the particular wireless device such that wireless devices with proportionately higher quality of service requirements produce proportionately higher power levels and wireless devices with proportionately higher data rates produce proportionately higher power levels at the base station receiving antenna.

4. The base station of claim 1 wherein the control signal controls the power transmitted by the particular wireless device such that wireless devices with proportionately higher data rates produce proportionately higher power levels at the base station receiving antenna.

5. A base station for controlling the power transmitted by a plurality of wireless devices of mixed types comprising:
a transmitting antenna;
a receiving antenna; and
a processor for receiving a signal from the receiving antenna, for recognizing the type of a particular wireless device which is transmitting the signal, wherein the type of the particular wireless device is at least partially defined by the quality of service requirement of the particular wireless device, and for producing a control signal which is sent to and transmitted by the transmitting antenna, the control signal containing control data based on the recognized type of the particular wireless device which may be utilized by the particular wireless device to control the power transmitted to the base station by the particular wireless device.

6. The base station of claim 5 wherein the control signal controls the power transmitted by the particular wireless device such that wireless devices with proportionately higher quality of service requirements produce proportionately higher power levels at the base station receiving antenna.

7. A method for controlling the power transmitted by wireless devices of mixed types comprising:
receiving at a base station a data signal from a particular wireless device;
determining at the base station the type of the particular wireless device, wherein the type of the particular wireless device is at least partially defined by the data rate of the particular wireless device; and
sending a control signal from the base station to control the power transmitted by the particular wireless device based on the determination of the type of the particular wireless device.

8. The method of claim 7 wherein the control signal controls the power transmitted by the particular wireless device such that wireless devices with proportionately higher data rates produce proportionately higher power levels as received at the base station antenna.

9. A method for controlling the power transmitted by wireless devices of mixed types comprising:
receiving at a base station a data signal from a particular wireless device;
determining at the base station the type of the particular wireless device, wherein the type of the particular wireless device is at least partially defined by the quality of service requirement of the particular wireless device; and
sending a control signal from the base station to control the power transmitted by the particular wireless device based on the determination of the type of the particular wireless device.

10. The method of claim 9, wherein the type of the particular wireless device is at least partially defined by the data rate of the particular wireless device.

11. The method of claim 10 wherein the control signal controls the power transmitted by the particular wireless device such that wireless devices with proportionately higher quality of service requirements produce proportionately higher power levels as received at the base station antenna and wireless devices with proportionately higher data rates produce proportionately higher power levels as received at the base station antenna.

12. The method of claim 9 wherein the control signal controls the power transmitted by the particular wireless device such that wireless devices with proportionately higher quality of service requirements produce proportionately higher power levels as received at the base station antenna.

13. A base station for controlling the power transmitted by wireless devices of mixed types comprising:
a transmitting antenna;
a receiving antenna for receiving a composite spread signal;
a memory for storing a unique code for each wireless device;
a despreader which retrieves the unique code which corresponds to a particular wireless device which is transmitting from the memory and uses the unique code to partially despread the composite spread signal to form a partially despread signal; and
a processor for determining the type of the particular wireless device, wherein the type of the particular wireless device is defined at least in part by the data rate of the particular wireless device, and for determining the power received at the base station receiving antenna from the particular wireless device, and for producing a control signal based on the type of the particular wireless device for controlling the power transmitted by the particular wireless device, wherein the control signal is sent to the transmitting antenna and transmitted.

14. The base station of claim 13 wherein the control signal controls the power transmitted by the particular wireless device such that wireless devices with proportionately higher data rates produce proportionately higher power levels at the receiving antenna of the base station.

15. A base station for controlling the power transmitted by wireless devices of mixed types comprising:
a transmitting antenna;
a receiving antenna for receiving a composite spread signal;
a memory for storing a unique code for each wireless device;
a despreader which retrieves the unique code which corresponds to a particular wireless device which is transmitting from the memory and uses the unique code to partially despread the composite spread signal to form a partially despread signal; and a processor for determining the type of the particular wireless device, wherein the type of the particular wireless device is defined at least in part by the quality of service requirement for the particular wireless device, and for determining the power received at the base station receiving antenna from the particular wireless device, and for producing a control signal based on the type of the particular wireless device for controlling the power transmitted by the particular wireless device, wherein the control signal is sent to the transmitting antenna and transmitted.

16. The base station of claim 15 wherein the type of the particular wireless device is defined at least in part by the data rate of the particular wireless device.

17. The base station of claim 15 wherein the control signal controls the power transmitted by the particular wireless device such that wireless devices with proportionately higher quality of service requirements produce proportionately higher power levels at the receiving antenna of the base station antenna of the base station.

18. The base station of claim 17 wherein the control signal controls the power transmitted by the particular wireless device such that wireless devices with proportionately higher data rates produce proportionately higher power levels at the receiving antenna of the base station.

19. A method for controlling the power transmitted by wireless devices of mixed types comprising:

receiving a composite spread signal of the signals transmitted by a plurality of wireless devices;

retrieving a unique code from memory corresponding to a particular wireless device which is transmitting and using the unique code to partially despread the composite spread signal;

determining the current power received from and the type of the particular wireless device, wherein the type of the particular wireless device is defined at least in part by the data rate of the particular device; and producing a control signal based on the type of the particular wireless device for controlling the power transmitted from the particular wireless device, and transmitting the control signal.

20. The method of claim 19 wherein the type of the particular wireless device is defined at least in part by the quality of service requirement of the particular wireless device.

21. The method of claim 19 wherein the control signal controls the power transmitted by the particular wireless device such that wireless devices with proportionately higher data rates produce proportionately higher power levels as received by the base station.

22. A method for controlling the power transmitted by wireless devices of mixed types comprising:

receiving a composite spread signal of the signals transmitted by a plurality of wireless devices;

retrieving a unique code from memory corresponding to a particular wireless device which is transmitting and using the unique code to partially despread the composite spread signal;

determining the current power received from and the type of the particular wireless device, wherein the type of the particular wireless device is defined at least in part by the quality of service requirement of the particular wireless device; and producing a control signal based on the type of the particular wireless device for controlling the power transmitted from the particular wireless device, and transmitting the control signal.

23. The method of claim 22 wherein the control signal controls the power transmitted by the particular wireless device such that wireless devices with proportionately higher quality of service requirements produce proportionately higher power levels as received by the base station.

24. The method of claim 23 and further wherein the control signal controls the power transmitted by the particular wireless device such that wireless devices with proportionately higher data rates produce proportionately higher power levels as received by the base station.

* * * * *